United States Patent [19]
Zehavi

[11] Patent Number: 5,757,767
[45] Date of Patent: May 26, 1998

[54] METHOD AND APPARATUS FOR JOINT TRANSMISSION OF MULTIPLE DATA SIGNALS IN SPREAD SPECTRUM COMMUNICATION SYSTEMS

[75] Inventor: Ephraim Zehavi, Haifa, Israel

[73] Assignee: Qualcomm Incorporated, San Diego, Calif.

[21] Appl. No.: 741,229

[22] Filed: Oct. 29, 1996

Related U.S. Application Data

[63] Continuation of Ser. No. 424,773, Apr. 18, 1995, abandoned.

[51] Int. Cl.$^6$ ............... H04J 13/04; H04B 7/216; H04Q 7/30
[52] U.S. Cl. ............... 370/208; 370/320; 370/335; 370/342
[58] Field of Search ............... 370/209, 208, 370/203, 206, 207, 320, 335, 342, 441; 375/25

[56] References Cited

U.S. PATENT DOCUMENTS

| | | | |
|---|---|---|---|
| 4,888,788 | 12/1989 | Teranishi et al. | 375/1 |
| 4,901,307 | 2/1990 | Gilhousen et al. | 370/18 |
| 5,101,501 | 3/1992 | Gilhousen et al. | 455/33 |
| 5,103,459 | 4/1992 | Gilhousen et al. | 375/1 |
| 5,109,390 | 4/1992 | Gilhousen et al. | 375/1 |
| 5,166,951 | 11/1992 | Schilling | 375/1 |
| 5,228,054 | 7/1993 | Rueth et al. | 375/1 |
| 5,228,056 | 7/1993 | Schilling | 375/1 |
| 5,267,261 | 11/1993 | Blakeney et al. | 375/1 |
| 5,309,474 | 5/1994 | Gilhousen et al. | 375/1 |
| 5,406,629 | 4/1995 | Harrison et al. | 380/34 |
| 5,550,809 | 8/1996 | Bottomley | 370/209 |

OTHER PUBLICATIONS

Ohira, Takao et al., "Picture Quality of Hadamard Transform ..." Appl. of Walsh Functions, 1973 Proc., Naval Res. Lab, pp. 127–129.

*Digital Communications with Space Applications*, S.W. Golomb et al., Prentice Hall, Inc. 1964, pp. 45–64.

*Primary Examiner*—Douglas W. Olms
*Assistant Examiner*—Matthew C. Phillips
*Attorney, Agent, or Firm*—Russell B. Miller; Gregory D. Ogrod

[57] ABSTRACT

A more efficient and less complex structure and method for combining multiple user channels onto a single carrier frequency in spread spectrum communication systems. A single transformation element, such as a fast Hadamard Transformation processor, is used to orthogonally encode and combine a series of subscriber digital data signals in parallel. Portions of the orthogonally encoded and combined data signals are then selected over preselected time intervals to generate a single encoded data signal which is subsequently PN spread, subjected to analog signal processing, and transmitted to system subscribers. This is typically effected by summing digital values in an array of data signal combiners. An exemplary data transformation device uses at least one of a preselected set of orthogonal functions as a controlling pattern for interconnection of the combining elements. Each of the combining elements receives at least two input signals, either data or previously combined data, and produces a combined encoded signal output. The order of combination maps the input data signals into an orthogonal combined signal. Portions of the combined data signals are then selected and transferred in order as a serialized data stream for subsequent spreading and transmission as a communication signal.

19 Claims, 9 Drawing Sheets

METHOD AND APPARATUS FOR JOINT TRANSMISSION OF MULTIPLE DATA SIGNALS IN SPREAD SPECTRUM COMMUNICATION SYSTEMS

This is a Continuation of application Ser. No. 08/424,773, filed Apr. 18, 1995, now abandoned.

BACKGROUND OF THE INVENTION

I. Field of the Invention

The present invention relates to multiple access communication systems, such as wireless data or telephone systems, and satellite repeater type spread spectrum communication systems. More particularly, the invention relates to a method and apparatus for combining multiple user channel signals onto a common carrier in a spread spectrum communication system by using a single transformation element. The invention further relates to combining multiple CDMA channels into a single communication signal using a single FHT element.

II. Description of the Related Art

A variety of multiple access communication systems have been developed for transferring information among a large number of system users. Techniques employed by such multiple access communication systems include time division multiple access (TDMA), frequency division multiple access (FDMA), and AM modulation schemes, such as amplitude companded single sideband (ACSSB), the basics of which are well known in the art. However, spread spectrum modulation techniques, such as code division multiple access (CDMA) spread spectrum techniques, provide significant advantages over the other modulation schemes, especially when providing service for a large number of communication system users. The use of CDMA techniques in a multiple access communication system is disclosed in the teachings of U.S. Pat. No. 4,901,307, which issued Feb. 13, 1990 under the title "*Spread Spectrum Multiple Access Communication System Using Satellite Or Terrestrial Repeaters,*" is assigned to the assignee of the present invention, and is incorporated herein by reference.

The 4,901,307 patent discloses a multiple access communication system technique in which a large number of generally mobile or remote system users each employs a transceiver to communicate with other system users or desired signal recipients, such as through a public telephone switching network. The transceivers communicate through satellite repeaters and gateways or terrestrial base stations (also sometimes referred to as cell-sites or cells) using code division multiple access (CDMA) spread spectrum type communication signals. Such systems allow the transfer of various types of data and voice communication signals between system users, and others connected to the communication system.

Communication systems using spread spectrum type signals and modulation techniques, such as disclosed in U.S. Pat. No. 4,901,307, provide increased system user capacity over other techniques because of the manner in which the full frequency spectrum is used concurrently among system users within a region, and 'reused' many times across different regions serviced by the system. The use of CDMA results in a higher efficiency in utilizing a given frequency spectrum than achieved using other multiple access techniques. CDMA techniques also permit problems such as multipath fading, encountered in conventional communication systems, to be more readily overcome, especially for terrestrial repeaters.

Pseudonoise (PN) code based modulation techniques used to generate the various communication system signals in wide band CDMA signal processing provide a relatively high signal gain. This allows spectrally similar communication signals to be more quickly differentiated which allows signals traversing different propagation paths to be readily distinguished from each other, provided path length differential causes relative propagation delays in excess of the PN chip period, that is, the inverse of the bandwidth. If a PN chip rate of say approximately 1 MHz is used in a CDMA communication system, the full spread spectrum processing gain, which is equal to the ratio of the spread bandwidth to system data rate, can be employed to distinguish or discriminate between signals or signal paths differing by more than one microsecond in path delay or time of arrival.

The ability to discriminate between multipath signals greatly reduces the severity of multipath fading, although it does not typically totally eliminate it because of occasional paths with delay differentials of less than a PN chip period. The existence of low delay paths is more likely for satellite repeaters or directed communication links where multipath reflections from buildings and other terrestrial surfaces is greatly reduced. Therefore, it is desirable to provide some form of signal diversity as one approach to reducing the deleterious effects of fading and additional problems associated with relative user, or repeater, movement.

Generally, three types of diversity are produced or used in spread spectrum type communication systems, and they are time, frequency, and space diversity. Time diversity is obtainable using data repetition, time interleaving of data or signal components, and error coding. A form of frequency diversity is inherently provided by CDMA in which the signal energy is spread over a wide bandwidth. Therefore, frequency selective fading affects only a small part of the CDMA signal bandwidth.

Space or path diversity is obtained by providing multiple signal paths through simultaneous links with a mobile or remote user through two or more base stations or transmission elements, for terrestrial-based repeater systems; or two or more satellite beams or individual satellites, for space-based repeater systems. That is, in the satellite communication environment or for indoor wireless communication systems, path diversity may be obtained by deliberately transmitting or receiving using multiple antennas. Furthermore, path diversity may be obtained by exploiting a natural multipath environment by allowing a signal arriving over different paths, each with a different propagation delay, to be received and processed separately for each path.

Examples of using path diversity in multiple access communication systems are illustrated in U.S. Pat. No. 5,101,501 entitled "*Soft Handoff In A CDMA Cellular Telephone System,*" issued Mar. 31, 1992, and U.S. Pat. No. 5,109,390 entitled "*Diversity Receiver In A CDMA Cellular Telephone System,*" issued Apr. 28, 1992, both assigned to the assignee of the present invention, and incorporated herein by reference.

In the base station- or gateway-to-subscriber link, the binary sequences used for spreading the spectrum are constructed from two different types of sequences, each having different properties and serving a different function. An outer code is used to discriminate between signals transmitted by different base stations and between multipath signals, and an inner code is used to discriminate between different users within a region or being serviced by a common cell or satellite beam.

CDMA type spread spectrum communication signals are generally formed by first applying the separate inner 'user' or 'subscriber' orthogonal code to each data signal intended for a system user or subscriber. The data signals are typically encoded and interleaved prior to this operation, and can also have additional scrambling codes applied as desired. The outer PN spreading code is then applied and the resulting digital signals converted to analog form and up-converted to a desired carrier frequency. Signals intended for system subscribers in a given cell, sector, or satellite beam are combined to form a composite waveform which is modulated onto on a single carrier signal as a spread spectrum communication signal or beam.

However, the above series of operations requires separate components for first orthogonally encoding and then spreading each of the individual data signals. This technique also requires fairly complex circuitry for adding or combining all of the spread signals. While such complexity can be readily accommodated for typical terrestrial based repeaters servicing only 64 user channels per cell, it becomes increasingly difficult as the number of user channels increases to around 128. At the same time, each gateway in satellite based repeater systems handles a number of beams per satellite along with multiple satellites at any time. This increases both the complexity of each beam summation circuit and the overall complexity of the gateway in individually processing the many spread data channels. This also requires very accurate signal synchronization among the circuit elements to achieve the proper timing for combining signals.

It is desirable to reduce the overall complexity of circuitry employed for the data symbol modulation and spreading operations. It is also desirable to decrease the complexity of circuitry required to implement signal combination for multiple channels on a single signal carrier.

SUMMARY OF THE INVENTION

In view of the above and other problems found in the art relative to generation of common carrier spread spectrum communication signals, in multiple access communication systems, one purpose of the present invention is to decrease the complexity of circuitry needed to form each common carrier communication signal.

A second purpose of the invention is to provide a technique that decreases the overall complexity of processing elements needed to orthogonally encode multiple data channels used to generate spread spectrum communication signals.

Another purpose of the invention is to provide a technique that decreases the overall complexity and cost of a gateway while increasing reliability and control efficiency.

An advantage of the invention is that simultaneous inner code modulation is implemented with automatic signal synchronization.

Another advantage of the invention is that simultaneous outer code modulation and filtering of multiple CDMA channels is provided for, which supports more reliable data transfer for higher data rate channels.

These and other purposes, objects, and advantages are realized in a method and apparatus for orthogonally encoding a plurality of digital data signals in a spread spectrum multiple access communication system. Communication system users communicate through base stations or satellite repeaters, each using a different coded channel within a given carrier frequency. Data to be transmitted to each system subscriber over user channels is generally first prepared using any of a number of desired encoding, interleaving, and scrambling operations. The resulting data symbols are then covered or modulated using at least one orthogonal function or code sequence selected from a plurality of predetermined orthogonal functions, typically Walsh functions.

The orthogonal encoding is accomplished by using a single data transformation device to receive a plurality of the digital data signals, or encoded data symbols, in parallel and apply at least one preselected orthogonal function to each received data signal. This produces orthogonally covered data signals for each received digital data signal. The parallel input data signals are each mapped into an orthogonally encoded and combined output data stream by the transformation device. In the preferred embodiment, a single transformation element, such as a fast Hadamard Transformer, is used to apply the orthogonal coding and combine portions of the data signals together. A relative subscriber signal gain adjustment factor can be applied to each channel before data is input to the transformation device.

A pre-selected portion of each of the orthogonally encoded and combined data signals, or data streams, is selected over preselected time intervals, using a selection mechanism, and output from the transformation device. This generates a serial data sequence of the selected portions, converting the transformation output to a serial data stream. This data stream is then transferred in turn to a signal spreading stage or elements used to generate and apply a pseudorandom noise (PN) spreading code. The PN spread signals can then be band pass filtered to remove unwanted frequency components and subjected to analog signal processing. An analog transmission stage connected to the spreading element uses the modulation signal for modulating a carrier signal.

In one embodiment, the data transformation device comprises a plurality of combining elements connected to receive data signals in parallel and form combinations thereof according to the preselected orthogonal function. The combining elements receive and sum selected portions of the data signals together so as to produce combined orthogonally covered data signals.

The combining elements are typically configured as an array of summation elements arranged with a first sub-set of elements connected to receive the input data signals. In one embodiment the elements are arranged in an N by $\log_2 N$ array, where N is the number of input channels or signals being accommodated. The array is divided generally into $\log_2 N$ signal processing layers of elements for which one-half of the inputs in each layer are sign reversed.

Each of the first sub-set of N combining elements are connected to receive two of the input data signals, and each subsequent sub-set of N combining elements are connected to receive two outputs from the previous sub-set. The combining elements produce orthogonally encoded and combined data signals by combining portions of data signals with each other in preselected patterns or orders. The preselected signal combining patterns generate an orthogonal function that interacts with the input data at the same time the data is being combined into singular output signals. The orthogonal function imposed on or used to map the data into a covered signal, can be a Walsh function or one or more predetermined short PN codes or functions.

The combined data values are transferred as a serialized data stream and decoded by subscriber units. A plurality of subscriber units, each including a mobile receiver, select and receive spread spectrum communication signals from at least one gateway, and decode them to provide respective digital data signals for a subscriber.

BRIEF DESCRIPTION OF THE DRAWINGS

The features, objects, and advantages of the present invention will become more apparent from the detailed description set forth below when taken in conjunction with the drawings in which like reference characters identify like elements throughout and wherein.

DETAILED DESCRIPTION OF THE PREFERRED EMBODIMENTS

The present invention provides a new method and apparatus for modulating multiple user communication channels onto a single carrier signal in spread spectrum multiple access communication systems. A new modulation technique is employed that provides a more efficient and less complex structure for combining the various user channels onto a single frequency.

In a typical CDMA communication system, such as a wireless data or telephone system, base stations within predefined geographical regions, or cells, each use several spread spectrum modems to process communication signals for system users. Each spread spectrum modem generally employs a digital spread spectrum transmission modulator, at least one digital spread spectrum data receiver and at least one searcher receiver. During typical operations, a modem in the base station is assigned to each remote or mobile user or subscriber unit as needed to accommodate transfer of communication signals with the assigned subscriber. If the modem employs multiple receivers, then one modem accommodates diversity processing, otherwise multiple modems may be used in combination. For communication systems employing satellite repeaters, these modems are generally placed in base stations referred to as gateways or hubs that communicate with users by transferring signals through the satellites. There may be other associated control centers that communicate with the satellites or the gateways to maintain system wide traffic control and signal synchronization.

Figure 1:
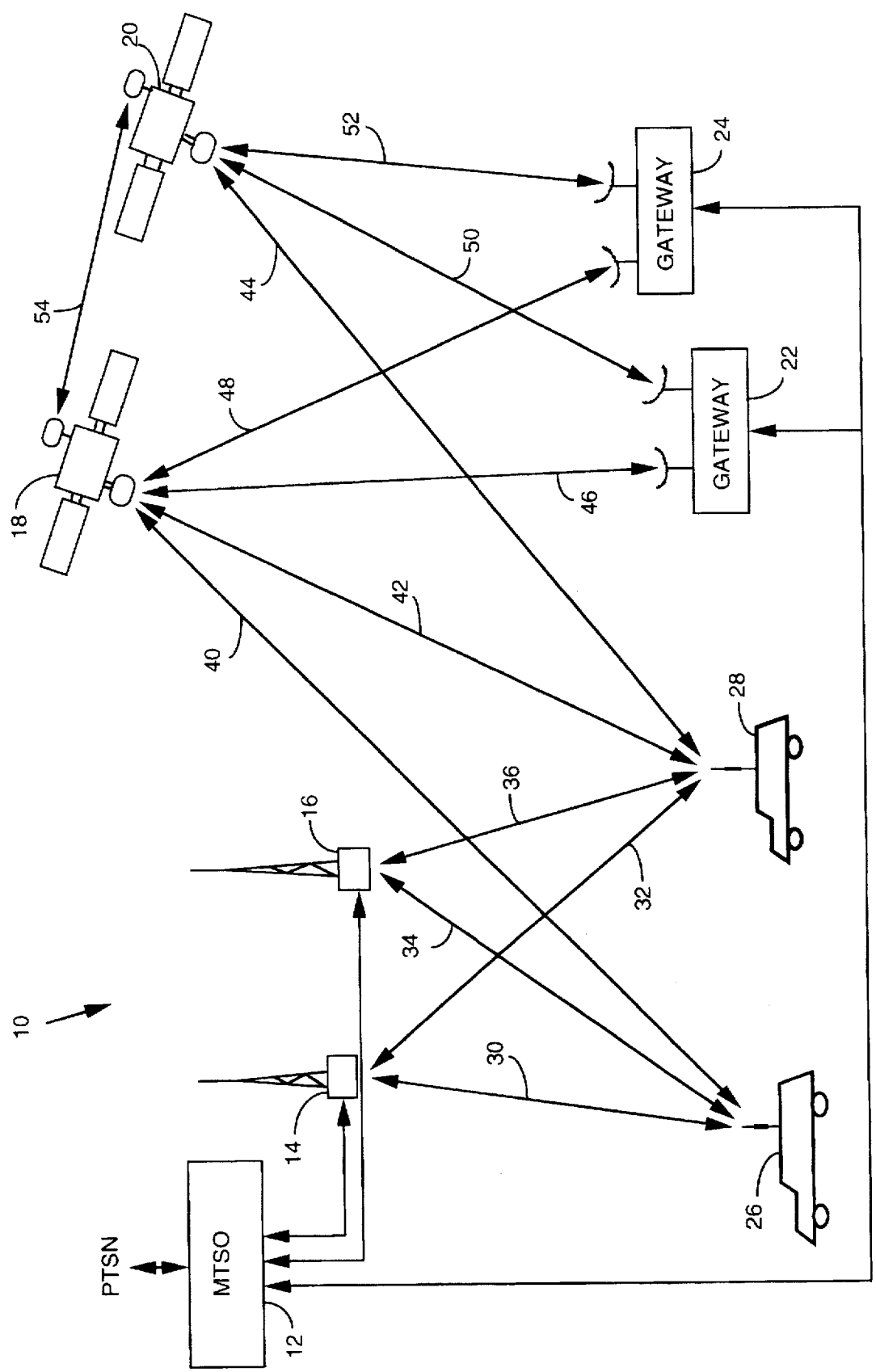
FIG. 1 illustrates a schematic overview of an exemplary CDMA wireless communication system.

An exemplary wireless communication system constructed and operating according to the principles of the present invention, is illustrated in FIG. 1. A communication system 10 illustrated in FIG. 1 utilizes spread spectrum modulation techniques in communicating between communication system remote or mobile subscriber units having wireless data terminals or telephones, and system base stations. Cellular telephone type systems in large metropolitan areas may have hundreds of base stations serving thousands of mobile system users using terrestrial based repeaters. Fewer satellite repeaters are typically used in a communication system to service more users per repeater but distributed over larger geographical regions.

As seen in FIG. 1, communication system 10 uses a system controller and switch network 12, also referred to as mobile telephone switching office (MTSO), which typically includes interface and processing circuitry for providing system-wide control for base stations or gateways. Controller 12 also controls routing of telephone calls between a public switched telephone network (PSTN) and base stations or gateways and subscriber units. The communication link that couples controller 12 to various system base stations can be established using known techniques such as, but not limited to, dedicated telephone lines, optical fiber links, or microwave or dedicated satellite communication links.

In the portion of the communication system illustrated in FIG. 1, two exemplary base stations 14 and 16 are shown for terrestrial repeater communications, along with two satellite repeaters 18 and 20, and two associated gateways or hubs 22 and 24. These elements of the system are used to effect communications with two exemplary remote subscriber units 26 and 28, which each have a wireless communication device such as, but not limited to, a cellular telephone. While these subscriber units are discussed as being mobile, it is also understood that the teachings of the invention are applicable to fixed units where remote wireless service is desired. This latter type of service is particularly relevant to using satellite repeaters to establish communication links in many remote areas of the world.

The terms beams (spots) and cells, or sectors, are used interchangeably throughout since they may be referred to in this manner in the art and the geographic regions serviced are similar in nature. Although, certain characteristics of the transmission paths and restraints on frequency and channel reuse differ between the repeater platforms. A cell and a beam both cover a prescribed geographic region on the Earth's surface. In addition, sectors generally cover different geographical regions within a cell, while some satellite beams operating at different frequencies, sometimes referred to as 'sub-beams' or 'FDMA signals' (within a spot), cover a common geographical region. Beams can also use different signal characteristics such as polarization mode to distinguish between each other.

The terms base station and gateway are also sometimes used interchangeably, with gateways being perceived in the art as specialized base stations that direct communications through satellite repeaters and have more 'functions,' with associated equipment, to perform to maintain such communication links through moving repeaters, while base stations use terrestrial antennas to direct communications within a surrounding geographical region. Central control centers will also typically have more functions to perform when interacting with gateways and moving satellites.

It is contemplated for this example that each of base stations 14 and 16 provide service over individual geographic regions or 'cells' serviced by transmission patterns from their respective antennas, while beams from satellites 18 and 20 are directed to cover other respective geographic regions. However, it is readily understood that the beam coverage or service areas for satellites and the antenna patterns for terrestrial repeaters may overlap completely or partially in a given region depending on the communication system design and the type of service being offered. Accordingly, at various points in the communication process handoffs may be made between base stations or gateways servicing the various regions or cells, and diversity may also be achieved between any of these communication regions or devices.

In FIG. 1, some of the possible signal paths for communication links between base station 14 and subscriber units 26 and 28 are illustrated by a series of lines 30 and 32, respectively. The arrowheads on these lines illustrate exemplary signal directions for the link, as being either a forward or a reverse link, and serve as illustration only for purposes of clarity and not as any restrictions on actual signal patterns. In a similar manner, possible communication links between base station 16 and subscriber units 26 and 28, are illustrated by lines 34 and 36, respectively.

Additional possible signal paths are illustrated for communications being established through satellites 18 and 20 between one or more gateways or centralized hubs 22 and 24, and subscriber units 26 and 28. The satellite-user portions of these communication links are illustrated by a series of lines 40, 42, and 44, and the gateway-satellite portions by lines 46, 48, 50, and 52. In some configurations it may also be possible to establish direct satellite-to-satellite communications such as over a link indicated by lines 54.

The geographic areas or cells serviced by the base stations are designed in substantially non-overlapping or non-intersecting shapes that normally place a user or subscriber unit closer to one base station than another, or within one cell sector where the cell is further sub-divided. This is also substantially the same for satellite communications, although the determinative factor here is the presence of a subscriber unit in a particular beam pattern, and its signal strength, but not relative closeness to a satellite.

In current CDMA wireless or cellular telephone systems, each base station or gateway also transmits a 'pilot carrier' signal throughout its region of coverage. For satellite systems, this signal is transferred within each satellite 'beam' and originates with specific gateways being serviced by the satellite. A single pilot is transmitted for each gateway or base station and shared by all users of that gateway, except in the case of regions subdivided into sectors, where each sector might have its own distinct pilot signal. The pilot signal generally contains no data modulation and is used by subscriber units to obtain initial system synchronization and to provide robust time, frequency and phase tracking of the base station transmitted signals. Each gateway or base station also transmits spread spectrum modulated information, such as gateway identification, system timing, user paging information, or various other signals.

While each base-station or gateway has a unique pilot signal (subject to system wide re-use), they are not generated using different PN code generators, but use the same spreading code at different code phase offsets. This allows PN codes that can be readily distinguished from each other, in turn distinguishing originating base stations and gateways, or cells and beams. Using one pilot signal code sequence throughout a communication system allows subscriber units to find system timing synchronization with a single search over all pilot signal code phases.

In the alternative, a series of PN codes are used within the communication system with different PN codes being used for each gateway, and possibly for each satellite plane through which gateways communicate. It will be readily apparent to those skilled in the art that as many or as few PN code as desired can be assigned to identify specific signal sources or repeaters in the communication system. That is, codes can be employed to differentiate each repeater or signal originator within the system as desired, subject to the total number of possible communication channels and a desire to maximize the number of users addressable within the system.

The carrier phase obtained from tracking the pilot carrier is used as a carrier phase reference for demodulating user information signals transmitted by bases stations 14 and 16 and gateways 22 and 24. This technique allows many traffic channels or user signal carriers to share a common pilot signal for carrier phase reference.

Upon acquiring or synchronizing with a pilot signal, the subscriber unit then searches for another signal, referred to as the sync or synchronization signal or channel which typically uses a different PN code having the same sequence length as the pilot. The synchronization signal transmits a message containing certain system information which further identifies the originating gateway and overall communication system, in addition to conveying certain synchronizing information for the long PN codes, interleaver frames, vocoders, and other system timing information used by a remote subscriber unit without requiring additional channel searching.

To assist in synchronization, regions within a communication system, or predefined smaller portions of the system, are supplied with accurate system wide synchronization information. In many embodiments, a Global Positioning System (GPS) type receiver is used by base stations or gateways to synchronize timing to Universal Coordinated Time (UTC). Accurate synchronization allows easy handoff between gateways for users moving from one service area to another. This timing synchronization is also used in communication systems using low earth orbit satellites to provide accurate satellite-to-satellite hand-off as gateways change which satellites are being used as they traverse their respective orbits.

Another signal, referred to as the paging signal or channel, may also be used by the communication system to transmit messages indicating the status of a call or communication information present or 'held' for a subscriber at a gateway. Subscriber units can monitor this and the pilot while in an inactive mode, that is, when no communication link is established. The paging signal typically provides appropriate channel assignments for use when a system user initiates a communication link, and requests a response from a designated subscriber unit.

As illustrated in FIG. 1, pilot signals are transmitted to subscriber unit 26 from base stations 14 and 16 using outbound or forward communication links 30 and 36, respectively, and from gateways 22 and 24, through satellite 18 using links 40, 46, and 48. Circuitry in subscriber unit 26 is then used to make a determination which base station or gateway (satellite) services it should use for communication, that is, generally which cell or beam it is in, by comparing relative signal strengths for the pilot signals transmitted by base stations 14 and 16 or gateways 22 and 24. For purposes of clarity in illustration, in FIG. 1 satellite 20 is not shown as communicating with subscriber unit 26, although this may certainly be possible depending on the specific system configuration, satellite beam pattern distribution, and transfer of calls by MTSO 12.

In this example, subscriber unit 28 may communicate with base station 16 for terrestrial service purposes but with satellites 18 or 20 for gateway service purposes. When subscriber unit 28 initiates a call, a control message is transmitted to an appropriate base station or satellite gateway, here 16, 18, or 20. Either base station 16 or gateway 22 or 24, say through satellite 18, upon receiving a call request message, transfer the called number to system controller or MTSO 12, which then connects the call through the PSTN to intended recipients.

Spread spectrum type communication systems, such as the example illustrated in FIG. 1, use a waveform based on a direct sequence pseudonoise spread spectrum carrier. That is, a baseband carrier is modulated using a pseudonoise PN sequence to achieve the desired spreading effect. The PN sequence consists of a series of 'chips' which have a frequency much higher than the baseband communication signal being spread. A typical chip rate is on the order of 1.2288 MHz and is chosen according to total bandwidth, desired or allowable signal interference, and other criteria relating to signal strength and quality which are known to communication system designers skilled in the art. Those skilled in the art appreciate how the chip rate can be modified according to allocated spectrum, in view of cost constraints and communication quality trade-offs.

In the base station- or gateway-to-subscriber link, the binary sequences used for spreading the spectrum are constructed from two different types of sequences, each having different properties and serving a different function. An 'outer' code is used to discriminate between signals transmitted by different base stations and between multipath signals. This outer code is typically shared by all signals in a cell, or beam, and is generally a relatively short PN sequence. However, depending on system configuration, a set of PN code sequences could be assigned to each gateway or different PN codes could be used by the satellite repeaters. Each system design specifies the distribution of orthogonal 'outer' codes within the system according to factors understood in the art.

An 'inner' code is then used to discriminate between the different users within a region or between user signals transmitted by a single base station, gateway, or satellite beam on the forward link. That is, each subscriber unit has its own orthogonal channel provided on the forward link by using a unique covering PN code sequence. On the reverse link, the user signals are not completely orthogonal but are differentiated by the manner in which they are code symbol modulated. It is also understood in the art that additional spreading codes can be used in preparing data for transmission such as to provide an additional level of 'scrambling' to improve the signal gain during subsequent reception and processing.

It is well known in the art that a set of n orthogonal binary sequences of length n, for n being a power of 2, can be constructed. This is discussed in the literature, such as in Digital Communications with Space Applications, S. W. Golomb et al., Prentice-Hall, Inc., 1964, pp. 45–64. In fact, sets of orthogonal binary sequences are also known for most sequences having lengths which are multiples of four but less than two hundred. One class of such sequences that is relatively easy to generate is called the Walsh function, also known as Hadamard matrices.

A Walsh function of order n over the real field can be defined recursively as:

$$W(n) = \begin{vmatrix} W(n/2) & W(n/2) \\ W(n/2) & W^*(n/2) \end{vmatrix}$$

where W* denotes the real inverse of W, and W(1)=1(i.e. W*(1)=−1).

Therefore the first few Walsh functions or orders 2, 4, and 8 can be represented as:

$$W(2) = \begin{vmatrix} 1 & 1 \\ 1 & -1 \end{vmatrix} \text{ and}$$

$$W(4) = \begin{vmatrix} 1 & 1 & 1 & 1 \\ 1 & -1 & 1 & -1 \\ 1 & 1 & -1 & -1 \\ 1 & -1 & -1 & 1 \end{vmatrix}$$

$$W(8) = \begin{vmatrix} 1 & 1 & 1 & 1 & 1 & 1 & 1 & 1 \\ 1 & -1 & 1 & -1 & 1 & -1 & 1 & -1 \\ 1 & 1 & -1 & -1 & 1 & 1 & -1 & -1 \\ 1 & -1 & -1 & 1 & 1 & -1 & -1 & 1 \\ 1 & 1 & 1 & 1 & -1 & -1 & -1 & -1 \\ 1 & -1 & 1 & -1 & -1 & 1 & -1 & 1 \\ 1 & 1 & -1 & -1 & -1 & -1 & 1 & 1 \\ 1 & -1 & -1 & 1 & -1 & 1 & 1 & -1 \end{vmatrix}$$

A Walsh function or code sequence, then, is simply one of the rows of a Walsh function matrix, and a Walsh function matrix of order 'n' contains n sequences, each being n bits in length.

A Walsh function of order n (as well as other orthogonal functions) has the property that over an interval of n code symbols in a string of symbols, the cross-correlation between all of the different sequences within the set is zero, provided the sequences are temporally aligned. This is easily understood by observing that exactly half of the bits in every sequence differ from those in all other sequences. Another useful property is that one sequence always consists of all ones while all of the other sequences consist of half ones and half minus ones.

Several carrier waveforms can be used within communication system 10. In the preferred embodiment, a sinusoidal carrier is quadraphase (four phase) spread by a pair of binary PN sequences. In this approach, the spreading PN sequences are generated by two different PN generators of the same sequence length. One sequence bi-phase modulates an in-phase channel (I Channel) of a carrier signal and the other sequence bi-phase modulates a quadrature phase, or just quadrature, channel (Q Channel) of the carrier signal. The resulting signals are summed to form a composite four-phase carrier.

All signals transmitted by a base station or gateway share the same outer PN codes for both I and Q channels. As mentioned earlier, the signals are also spread with an inner orthogonal code generated using Walsh functions. The Walsh function size n, is set equal to the desired number of orthogonal channels to be accommodated on each common frequency carrier within communication system 10. An exemplary Walsh function size useful for implementing satellite based repeaters is one hundred and twenty-eight (n=128) for a gateway-to-subscriber link. This creates up to one hundred and twenty-eight different communication signals or channels for a given frequency within each gateway coverage region, each being assigned a unique orthogonal sequence. At least three of these sequences are dedicated to the pilot, synchronization and paging channel functions, with additional paging channels sometimes being used.

A signal addressed to a particular user is modulated by a particular orthogonal function, a Walsh code sequence or sequence of Walsh sequences, assigned by the gateway or a communication system controller for use during the duration of that user's link or information transfer. This represents application of the inner code. The resulting inner coded signal is then multiplied by the outer PN sequences which are the same code, but shifted 90°, and applied to the I and Q channels, effectively resulting in bi-phase modulation for the outer code.

Neighboring cells, sectors, or other predefined geographical coverage regions can reuse orthogonal functions because the basic outer PN codes used in such regions are distinct from each other. Differing propagation times for signals arriving at a particular subscriber's location from two or more base stations or satellite beams, mean that it is not possible to preserve an absolute time alignment for signals as required for maintaining Walsh function orthogonality for multiple cells at one time. Reliance is placed on the outer PN codes to discriminate between signals received from different gateways or base stations. However, all signals transmitted by a base station over a single satellite beam are orthogonal to each other and do not substantially contribute interference to each other. This eliminates a majority of the interference in most locations, allowing a higher capacity to be obtained.

The pilot waveform typically uses the all-ones Walsh code sequence that is found in all (real) Walsh function sets. The use of the all-ones Walsh code sequence for all pilot carriers allows the initial search for the pilot waveform to ignore the Walsh code sequences until after outer code PN synchronization has been achieved. The Walsh framing is locked to the PN code cycle since the length of the Walsh frame is a factor of the PN sequence length. Therefore, provided that base station or gateway offsets of the PN code are multiples of one hundred twenty-eight (128) chips (or the particular chosen Walsh frame length for communication system 10) then the Walsh framing is known implicitly from the outer PN code timing cycle.

In synchronization, paging, and voice or traffic channel signals, input data, such as digitized speech, is typically encoded, provided with repetition, and then interleaved to provide error detection and correction functions. This allows the communication system to operate with lower signal-to-noise and interference ratios. Techniques for convolutional or other types of encoding, repetition, and interleaving are well known in the art. The symbols in the error correction encoded symbol stream for each channel are converted to real integers ('0' to a one and '1' to a minus one) and digitally multiplied by an assigned Walsh function or sequence for that channel and then digitally multiplied by or combined with the outer PN code after converting it to a sequence of the real field. The resulting spread symbol streams for each signal are then combined together to form a composite waveform.

The resulting composite waveform is then modulated onto a sinusoidal carrier, bandpass filtered, translated to the desired operating frequency, amplified and radiated by the antenna system. Alternate embodiments of the present invention may interchange the order of some of these operations for forming a transmitted signal. For example, it may be preferred to multiply each voice channel signal by the outer PN coded waveform and perform a filtering operation prior to summation of all the channel signals to be transmitted. Summation may be accomplished at several different points in the processing such as at the IF frequency, or at the baseband frequency, either before or after modulation by a PN sequence. It is well known in the art that the order of linear operations may be interchanged to obtained various implementation advantages and different designs.

Figure 2:
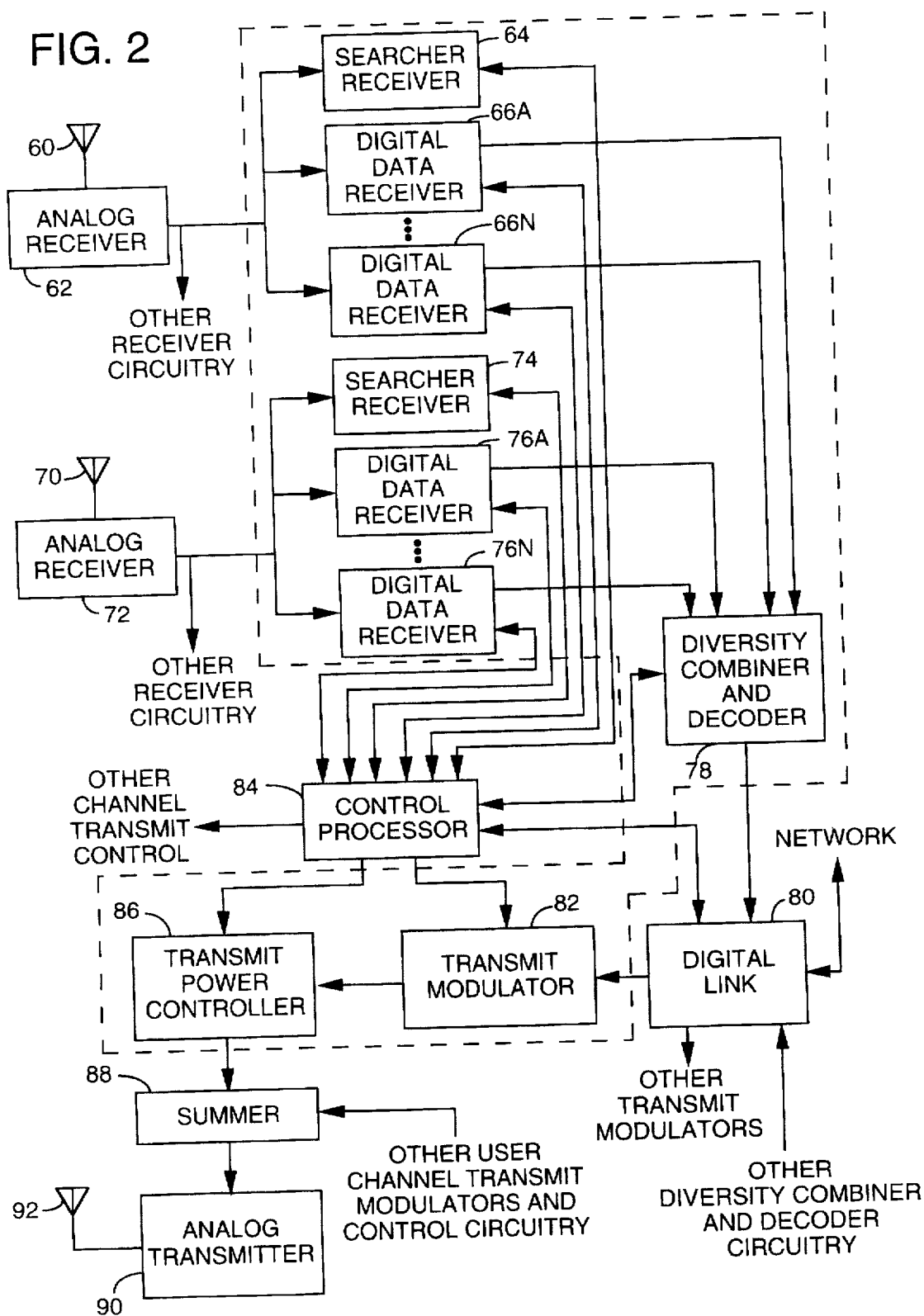
FIG. 2 illustrates a block diagram of exemplary gateway demodulation/modulation apparatus for a wireless CDMA communication system.

An exemplary embodiment of base station or gateway apparatus useful for implementing a CDMA communication system is illustrated in further detail in FIG. 2. In the gateway demodulator/modulator of FIG. 2, at least two receiver systems are utilized with each having a separate antenna 60 and 70, and analog receivers or sections 62 and 72, for effecting frequency or space diversity reception. Multiple antennas are used to achieve space diversity reception for a base station, generally within sectors. A gateway also generally has additional receiver sections for accommodating communication signals at additional carrier frequencies, timing offsets, or using other distinguishing parameters. Many such receiver sections may be used to accommodate all of the satellite beams and possible multipath signals being handled at any given time. The different receivers in a gateway generally share a common one or set of antennas in gateways which can receive multiple frequencies from a set of satellites.

The signals are downconverted, amplified, and digitized in analog receivers 62 and 72. Various schemes for RF-to-IF-to-Baseband frequency downconversion and analog-to-digital conversion for channel signals are well known in the art. The digitized signals are then output from analog receivers 62 and 72, and provided as inputs to a searcher receiver 64 and 74, and at least one digital data receiver 66 and 76, respectively. Additional digital data receivers (66B–66N, 76B–76N,) are used to obtain signal diversity for each subscriber unit, which may be optional for some system designs, and form the fingers of a rake design receiver section. These additional data receivers, alone or in combination with other receivers, track and receive subscriber signals along several possible propagation paths and provide diversity mode processing.

In each of the receiver systems, the signals are processed in a substantially identical manner until the signals undergo a diversity combination process. The elements within the dashed lines correspond to elements used to manage communications between one gateway and one mobile subscriber unit, although certain variations are known in the art. The output of the analog receivers or receiver sections are also provided to other elements to be used in communications with other subscriber units.

A diversity combiner and decoder 78 is coupled to the outputs of data receivers 66A–66N and 76A–76N and serves to combine these signals into one output which is then provided to a digital link or processing interface unit 80. Apparatus for constructing diversity combiner 78 is well known in the art and not illustrated further here. Digital link 80 is connected to a transmit modulator 82 for providing output data, and typically to a MTSO digital switch or network. Digital link 80 serves to control or direct the transfer of decoded, un-encoded, and encoded data signals between diversity combiner and decoder 78, the MTSO network, one or more gateway transmit modulators 82, and other such diversity combiners and decoders and gateway transmit modulators. A variety of known elements can be incorporated into or form digital link 80, including, but not limited to, vocoders and data modems and known digital data switching and storage components.

At least one gateway control processor 84 coupled to the sets of data receivers, along with the searcher receivers, digital link 80, and transmit modulator 82, provides command and control signals to effect functions such as, but not limited to, signal processing, timing signal generation, power and handoff control, diversity combining, and system interfacing with the MTSO. In addition control processor 84 assigns Walsh code sequences, transmitters, and receivers for use in subscriber communications. Control processor 84 also controls the generation and power of the pilot, synchronization channel, and paging channel signals and their coupling to a power controller before being summed with the other signals and output to an antenna.

Signals from the MTSO, within the communication system, or from other combiners, are coupled to an appropriate transmit modulator for transmission to a recipient subscriber using digital link 80 operating under the control of processor 84. Transmit modulator 82, also operating under the control of control processor 84, then spread spectrum modulates data for transmission to an intended recipient subscriber unit. The output of transmit modulator 82 is provided to a transmit power controller 86 which provides control over the transmission power used for the outgoing signal. This control assures the use of minimum power for purposes of interference, but other appropriate levels to compensate as needed for attenuation in the transmission path.

The output of power controller 86 is provided to a summer 88 where it is summed with the output from other transmit power control circuits whose outputs are directed to other subscriber units at a common transmission frequency. The output of summer 88 is provided to an analog transmitter 90 for further amplification at the desired RF frequency and output to an antenna 92 for radiating to subscriber units through satellite repeaters. As discussed earlier, base stations use one or two antennas for a cell or each sector, while gateways may use several such transmitters and antennas to communicate with multiple satellite repeaters.

Figure 3:
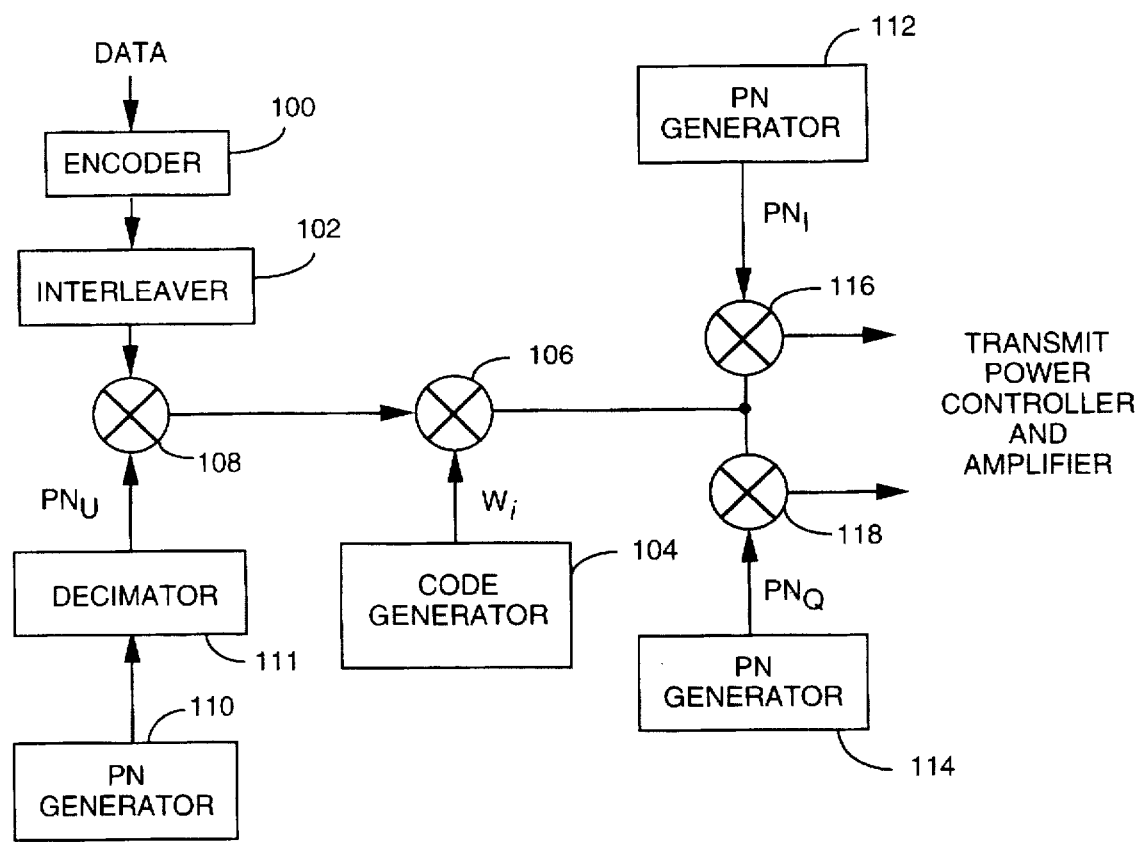
FIG. 3 illustrates a more detailed view of a typical transmit modulator useful in implementing the apparatus of FIG. 2.

An exemplary signal modulator design for implementing transmission modulator 82 is illustrated in FIG. 3. In FIG. 3, modulator 82 includes an encoder 100 and an interleaver 102. Prior to application of Walsh sequence coding, the signals carried by each channel are generally convolutionally encoded, with repetition, and interleaved in order to provide error detection and correction functions which allow the system to operate at a much lower signal-to-noise and interference ratio. Techniques for convolutional encoding, repetition, and interleaving are well known in the art.

The interleaved symbols from interleaver 102 are then orthogonally encoded or covered with an assigned orthogonal code sequence, Walsh code, supplied by a code generator 104. The code from generator 104 is multiplied by or combined with the symbol data in a logic element 106. The orthogonal function is typically clocked in at a rate of 1.2288 MHz. At the same time, in exemplary variable data rate systems including voice, facsimile (FAX), and high/low-speed data channels, the information symbol rate may vary, for example, from approximately 75 Hz to 76,800 Hz. Before being covered by the Walsh code, the interleaved data may also be multiplied with a binary $PN_U$ sequence in a second logic element 108 connected in series with the input of multiplier 106. This sequence is provided by output of a long PN code generator 110, typically also clocked at 1.2288 MHz, and then decimated in a decimator 111 to provide a lower rate such as 19,200 kbps. In the alternative, logic element 108 could be connected in series with the output of multiplier 106 with the resulting covered data from multiplier 106 being multiplied by the $PN_U$; sequence. When Walsh code and $PN_U$ sequences consist of binary '0' and '1' values instead of '−1' and '1', the multipliers can be replaced by logic elements such as exclusive-OR gates.

Code generator 110 generates a separate PN code sequence $PN_U$ corresponding to a unique PN sequence generated by or for each subscriber unit and can be constructed using a variety of known elements configured for this purpose. A subscriber unit address or user ID may be used to provide an additional factor for discriminating among system users. However, the $PN_U$ sequence format being used needs to conform to that of the Walsh codes. That is, either '−1/1' or '0/1' value sets are used together, so that conversion elements might be used on the output of a code generator to convert a '0/1' type sequence to a '1/−1' type sequence as required. In the alternative, a non-linear encryption generator, such as an encryptor using the data encryption standard (DES) to encrypt a 128-symbol representation of universal time using a user specific key, may be utilized in place of PN generator 110 as desired. The $PN_U$ sequence is either assigned for the duration of a given link or permanently to one unit.

The transmitter circuitry also includes two PN generators, 112 and 114, which generate the two different short $PN_I$ and $PN_Q$ code sequences for the In-Phase (I) and Quadrature (Q) channels. In the alternative, these generators could be time shared among several receivers using appropriate interface elements. An exemplary generation circuit for these sequences is disclosed in U.S. Pat. No. 5,228,054 entitled *"Power Of Two Length Pseudo-Noise Sequence Generator With Fast Offset Adjustments,"* issued Jul. 13, 1993, and assigned to the assignee of the present invention, and incorporated herein by reference. These PN generators are responsive to an input signal corresponding to a beam or cell identification signal from the control processor so as to provide a predetermined time delay or offset for the PN sequences. Although only two PN generators are illustrated for generating the $PN_I$ and $PN_Q$ sequences, it is readily understood that many other PN generator schemes may be implemented.

The orthogonally encoded symbol data output by multiplier 106 is then multiplied by the $PN_I$ and $PN_Q$ code sequences using a pair of logic elements or multipliers 116 and 118. The resulting signals are then transferred to appropriate power control and amplification circuitry, transmit power controller 86 and analog transmitter 90. Here, they are modulated onto an RF carrier, typically by bi-phase modulating a quadrature pair of sinusoids that are summed into a single signal. These signals are summed with the pilot and any setup carrier signals, along with other voice carrier signals. Summation may be accomplished at several different points in the processing such as at the IF frequency, or at the baseband frequency either before or after multiplication by the PN sequence associated with the channels within a particular cell.

The resulting output signal is then bandpass filtered, translated to the final RF frequency, amplified, filtered and radiated by the antenna of the gateway. As was discussed earlier, the filtering, amplification, translation and modulation operations may be interchanged. Additional details of the operation of this type of transmission apparatus are found in U.S. Pat. No. 5,103,459, issued Apr. 7, 1992, entitled *"System And Method For Generating Signal Waveforms In A CDMA Cellular Telephone,"* assigned to the same assignee as the present invention and incorporated herein by reference.

While much is known in the art about generating spread spectrum communication signals, the present invention allows an improvement in the manner in which information is transmitted to the subscriber units. That is, a new technique for preparing the forward link waveform being broadcast by gateways and satellite repeaters is provided for.

A communication signal $S_n(i)$ is generated in a gateway which is intended for transmission to or for an $i^{th}$ communication system user on both the appropriate I and Q channels. This signal follows the form:

$$S_n(i) = a_n(i) \cdot W_i \cdot [PN_I + jPN_Q], \quad i=0, \ldots, 127 \quad (1)$$

where $S_n(i)$ is the $n^{th}$ transmitted signal for user i, $W_i$ is a Walsh cover or function allocated to user i, $PN_I$ and $PN_Q$ are the spreading PN code sequences used for the I and Q channels, respectively, and $a_n(i)$ is the $n^{th}$ coded symbol for the $i^{th}$ user's signal. The gateway or satellite repeater performing the transmission of signal $S_n(i)$ transmits its pilot signal on both the I and Q channels, unless a pilot is not used. As before, this pilot signal is un-modulated by data, in other words, $a_n(0)$ equals 1. Any Walsh function is subsequently spread on the I and Q channels using the $PN_I$ and $PN_Q$ code sequences, respectively. Depending on the maximum values set within the communication system for the number of Wash codes or other functions used for spreading, on the order of up to 125 users are accommodated per frequency, with at least three channels being reserved for the pilot, synchronization, and paging functions, and with additional paging channels often being reserved.

With $\tilde{I}$ and $\tilde{Q}$ used to denote combined I and Q components for the transmitted signal, these components of the transmission follow the forms:

$$\tilde{I}(t) = \sum_{i=1}^{N} G_{k,i} \cdot \quad (2)$$

$$\left( \sum_n \alpha_n[i] \left( \sum_{r=1}^{128} W_i[r] \cdot PN_I[128n+r] \cdot h(t-(128n+r)T_c) \right) \right)$$

$$\tilde{Q}(t) = \sum_{i=1}^{N} G_{k,i} \cdot \quad (3)$$

$$\left( \sum_n \alpha_n[i] \left( \sum_{r=1}^{128} W_i[r] \cdot PN_Q[128n+r] \cdot h(t-(128n+r)T_c) \right) \right)$$

where:

$G_{k,i}$ is the energy/symbol for $i^{th}$ user;

N is the number of active users;

$W_i, W_i[r]$ represents the Walsh function or function chip for user i.;

h(t) is the impulse response of the waveshaping filter; while $a_n[i]$ represents the symbol transmitted by user i at time k. . Each symbol remaining constant over the duration of a Walsh function; and $PN_I[i], PN_Q[i]$ are the in-phase and quadrature PN sequence chips, respectively.

The signal S(t) transmitted from a communication system gateway through a satellite to all users sharing the same beam or sub-beam (frequency) has the form:

$$S(t) = \tilde{I}(t) \cdot \cos(\omega_0 t) - \tilde{Q}(t) \cdot \sin(\omega_0 t) \quad (4)$$

where $\omega_0$ represents the carrier frequency.

It has been discovered that a communication signal can be effectively generated by applying a parallel data symbol-to-code symbol transformation process to the I and Q channel data for all subscriber units serviced by each gateway, on a common frequency. In a preferred embodiment, this is accomplished by inputting all of the encoded and interleaved data for all 127 modulated channels (including sync and page but not pilot) and one unmodulated channel (pilot) into a single transformation process, such as using a Fast Hadamard Transform (FHT) device to generate a desired output signal. The resulting signal is an orthogonally encoded or covered signal for all of the channels. The total number of channels here is at most 128 (n=128).

Figure 4:
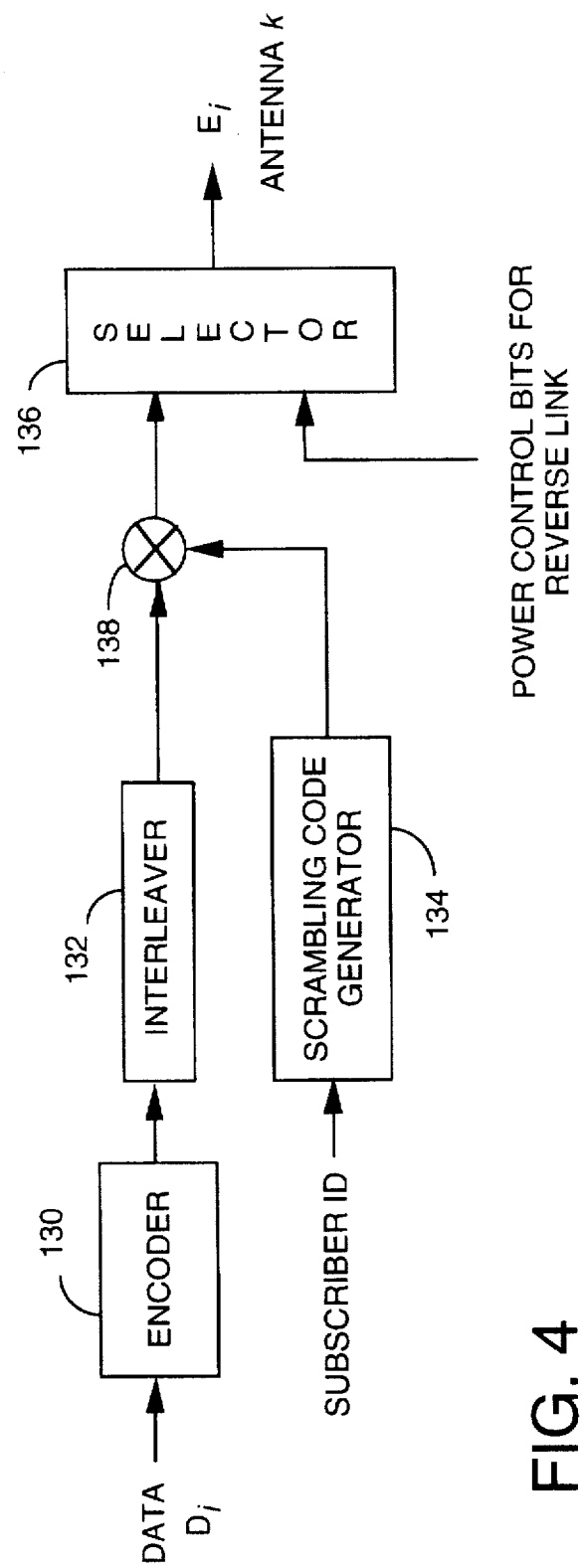
FIG. 4 illustrates a transmit modulator portion of the communication system gateway apparatus of FIG. 2 constructed and operating according to the present invention.
Figure 5:
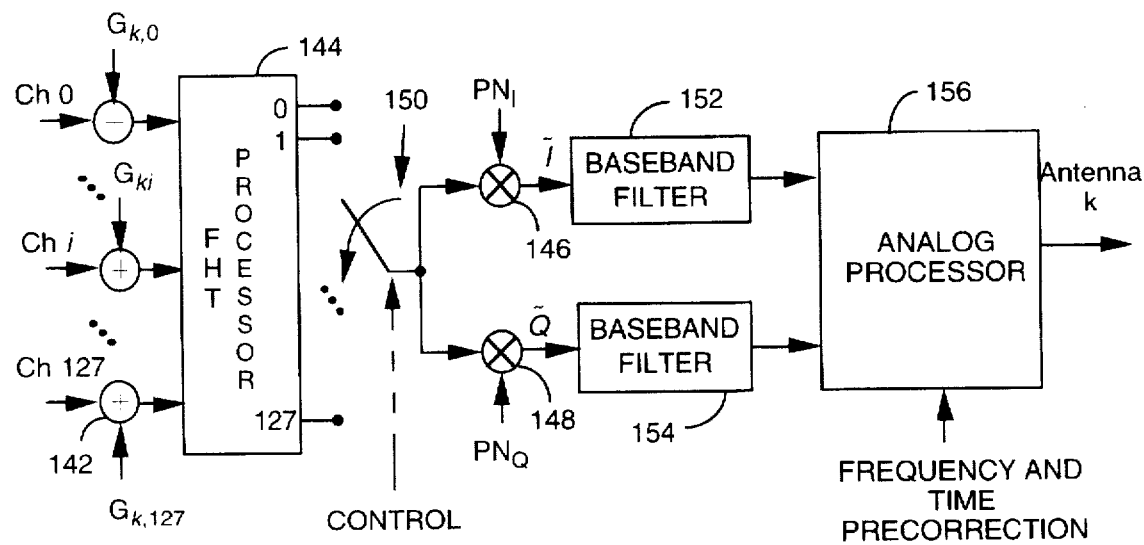
FIG. 5 illustrates a multi-signal multiplexing and FHT portion of the transmitter of FIG. 2 when using the modulator of FIG. 4.

A transmission modulator stage for obtaining this operation is illustrated in FIG. 5, and a preceding data preparation stage is shown in FIG. 4. The modulator architecture illustrated in FIG. 5 is configured to apply a forward modulation technique in which coded symbols for each $i^{th}$ user are generated using one FHT element or device and the data symbols for all 128 channels of one communication signal or beam frequency are then combined. That is, the 128 channels that are used for each frequency carrier, which may form a sub-beam component of a beam spot, are combined in one operation to produce the desired communication beam signal. Data intended for each subscriber can be transferred on multiple frequencies or sub-beams as desired and would be combined into each separate frequency carrier beam as appropriate. The selector subsystem forwards the user data for the $i^{th}$ subscriber to all sub-beams or carriers that are assigned to accommodate communication links for that user, such as for handoff procedures. This results in a highly efficient design which reduces the complexity and cost for the gateway.

As seen in FIG. 4, data $D_i$ which is intended for subscriber unit i, is prepared for transmission from a gateway or base station by first being encoded, typically using a rate ½ encoder 130. This data represents voice or other types of analog signals originating on a PSTN, or with other subscriber units, and being transferred through the MTSO. These signals have been processed according to typical analog techniques and previously amplified or filtered, then converted to digital form. For voice signals they are typically converted to digital form and then processed using a variable rate vocoder. In the alternative, data Di can originate as digital data of some type which is to be transferred to a subscriber unit.

After being encoded, the coded symbols for data $D_i$ ($E_i$ below) are transferred to an interleaver 132 where they are interleaved before being further coded or scrambled for transmission. The effect of the interleaver is to disperse symbols in the communication signal so that any two symbols in a contiguous sequence of input symbols are separated by at least a preselected number of symbols, or period of time, in the interleaver output. This provides time diversity and decreases the impact of signal attenuation or processing errors that cause the loss of a few consecutive symbols in the data stream. The synchronization channel symbols are also interleaved by an interleaver so that once the subscriber unit has acquired the pilot signal, if used, it also has immediate sync channel interleaver synchronization.

In some communication systems, the data can be easily scrambled to provide security or further signal diversity using a long PN code sequence or the like as provided from a code generator 134, and multiplying the interleaver outputs successively (or XORing if the outputs are in zero and one format). A power control factor may also be impressed on, or imbedded in, a subscriber bound communication signal from the gateway. That is, a series of bits are used to transfer power control information to the subscriber unit along with the data, if desired for specific communication system implementations. This is accomplished by inserting one or more power control bits at some predetermined interval in the data symbol stream. In the apparatus of FIG. 4, the power control bits are applied using a power control interface or selector 136. Those skilled in the art will readily understand the variety of techniques available for generating the power control bits and for determining their method of incorporation into the symbol data stream, including the storage of these bits and recall for incorporation in the symbol stream for a communication signal.

The output from the apparatus of FIG. 4 represents a communication signal or channel intended for a single user i and there are 127 such channels of data to be transmitted from a given gateway or gateway antenna k, at a given frequency, with the pilot being an additional (128th) unmodulated channel. As shown above, several transmitters are used by a gateway to cover transmissions over separate frequencies for multiple beams and sub-beams, with a single pilot generally being used for each sub-beam. It has been discovered that the traditional Walsh covering and combiner type of logic which is used to combine these 128 signals, can be eliminated by utilizing a larger FHT structure with appropriate inputs and switched outputs.

As illustrated in FIG. 5, the encoded, interleaved, power-bit imbedded and possibly scrambled data symbols are transferred as separate inputs to a single FHT processor 144 for the desired Fast Hadamard transformation. However, the signal from each channel is first applied to one input of a multiplication element or multiplier 142 ($142_0$–$142_{127}$) and a factor corresponding to signal gain $G_{k,i}$ ($G_{k,0}$–$G_{k,127}$) is applied as a second input for each multiplier. The relative gain factor $G_{k,i}$ adjusts the signal strength for each channel and effects forward power control in later stages. The gain adjusted signals are then applied as inputs to FHT processor 144. Alternatively, gain control need not be applied to all or any signals before being input to FHT processor 144, as desired for specific configurations.

The gain adjusted encoded data symbols applied to inputs of FHT processor 144 are transformed from data symbols into orthogonally covered or encoded modulation symbols. This orthogonal encoding occurs to all of the input symbols or data symbols being input to FHT processor 144 in parallel at substantially the same time. That is, the encoded data input for each channel or subscriber unit is covered with an appropriate orthogonal code or Walsh code sequence for that channel. This results in an orthogonally encoded symbol stream for each input data stream, here up to 128 channels at a time. However, as many or few of the total number of channels available to the communication system can be input at any time, depending on the specific system and FHT processor design. In some configurations, smaller FHT processors can be used with some form of signal multiplexing or, in the alternative, a smaller percentage of the total channels can be processed at any given time, depending on system capacity and data throughput.

In FIG. 5, the resulting 128 outputs from FHT processor element 144 are shown being transferred to I and Q channel processing elements 146 and 148, respectively, where they are subsequently multiplied or spread on the I and Q channels by $PN_I$ and $PN_Q$ sequences. This transfer is illustrated as a switched or selective signal line, such as using a selection mechanism 150 where each output is selected in turn and, thus, provides a covered symbol stream comprising 128 consecutive outputs from FHT processor 144. This selection process can be accomplished using a variety of mechanisms known in the art such as an array of electronic switches connected between respective ones of the output lines and a single signal bus over which the output is to be transferred. Each switch is then activated using control or command signals from a control processor, such as processor 84 discussed above.

In the alternative, the output of FHT processor 144 can also be received as a parallel output signal which is then converted to a serial data stream for further processing using one of a variety of known techniques, such as, but not limited to, accumulating or latching the output and clocking it out at $1/128^{th}$ of the input signal transfer rate, etc. There are a variety of accumulators, buffers, registers, and other elements known in the art for obtaining this type of transfer. The output signals can be chosen or effectively interleaved on a symbol-by-symbol basis or in any other grouping or block size as convenient for processing by individual subscriber terminals receiving the signals within the communication system.

The signal or signals output from FHT processor 144 and selection mechanism 150 are transferred to I and Q channel spreading elements, such as multipliers 146 and 148, where they are spread on the I and Q channels, respectively, by the $PN_I$ and $PN_Q$ sequences, producing desired $\tilde{I}$ and $\tilde{Q}$ signals. The outputs from each of spreading elements 146 and 148 are then transferred to baseband filters 152 and 154, respectively, to remove unwanted signal components arising during the spreading process. The filtered outputs are then transferred to analog transmission circuitry 156 where they are up-converted to the appropriate frequency and amplified, power adjusted, and modulated onto the desired carrier before transmission from the gateway antenna to the appropriate satellite repeaters and subscribers. This analog circuitry is discussed above, and is well known in the art.

Figures 6, 7:
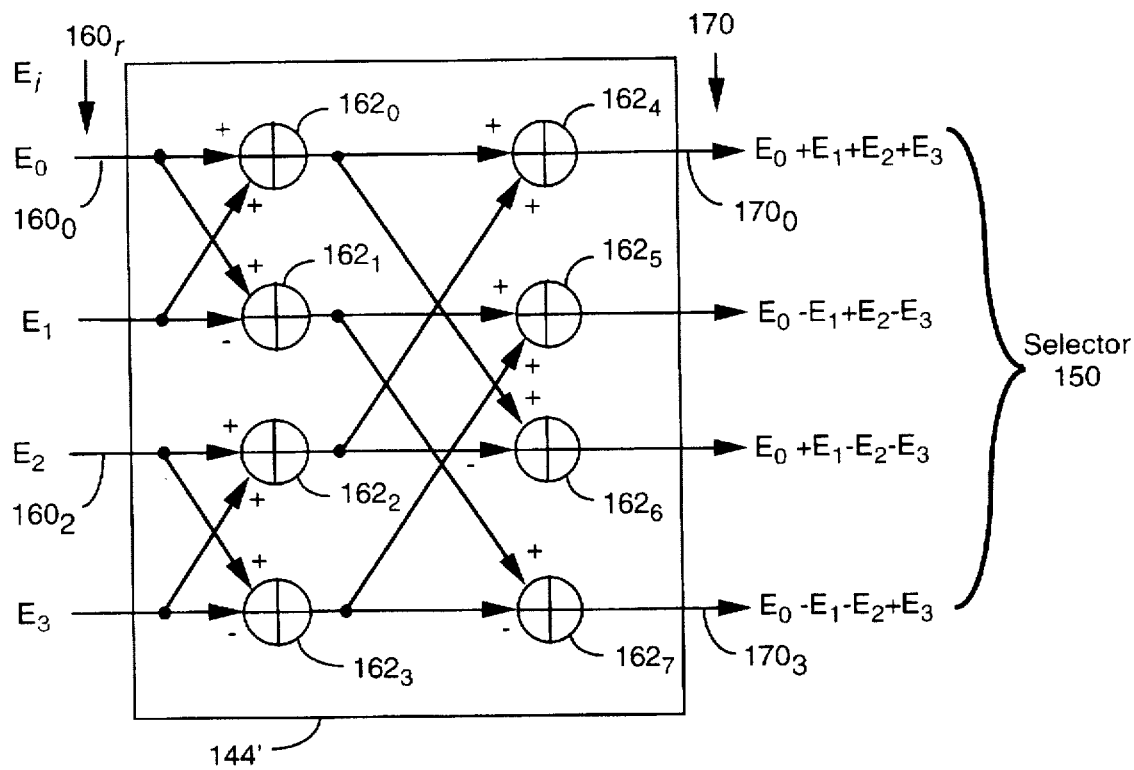
FIG. 6 illustrates an exemplary embodiment of an FHT processor useful for implementing the modulator of FIG. 4.
FIG. 7 illustrates an exemplary transformation operation implemented by the FHT processor of FIG. 6.

An exemplary approach to realizing the FHT processor structure used in FIG. 5 is illustrated in FIG. 6. For ease of illustration in this example, the FHT transformation is limited to using Walsh code sequences of length four, n=4, as illustrated above. However, it will be readily apparent to those skilled in the art that this process is also applicable to orthogonal functions of greater size or length, and typically involves on the order of 64–128 chip length code sequences. FIG. 6 also illustrates the use of four, i=3, input channels which increases correspondingly with the use of larger orthogonal functions or combining operations.

In FIG. 6, an FHT processor 144' is shown receiving a series of encoded data channels, or signals $E_i$, associated with input data signals $D_i$ over input signal lines or buses $160_i$. The signals received on inputs 160 comprise streams of encoded data symbols $a_n(i)$ (in this example $0 \leq i \leq 3$) for each outbound subscriber signal. The encoded data symbols are applied in parallel to a series of signal combiners $162_i$, here $162_0$–$162_3$. Signal combiners $162_i$, ($162_0$–$162_3$ along with $162_4$–$162_7$) combine the input data symbols in a preset order to generate the desired combination of all orthogonally covered (Walsh code) or modulated sequences.

First, certain ones of the input data are combined in one prearranged pattern, and then the results are combined in another pattern to achieve the final desired output. That is, a series of signals is output by FHT processor 144' that represents a combination of each input data signal as covered by an appropriate, preselected, orthogonal function. These signals are then transferred for transmission by selector 150. Note, that in this architecture no orthogonal function sources are needed, the orthogonal function is implemented by the combining architecture itself.

As illustrated in U.S. Pat. No. 5,103,459, referred to above, encoded data and orthogonal functions are typically combined using modulo two addition. In that approach, exclusive OR (XOR) gate logic is used where digital data having values of '0' and '1' is covered by a code sequence of 0's and 1's. Another method for accomplishing the combination is the use of multiplication, such as where the digital data and code have chips or sequence values of '1' and '−1', as discussed above. In addition, the state of the input data may be used to alter the state of the orthogonal function code symbols. That is, a data value of '1' enables the transfer of an orthogonal code sequence as originally set, and a data value of '−1' causes the values of the orthogonal code sequence to be altered or inverted during transfer, such as '1' →'−1' and '−1' →'1'. Circuitry to effect such an inversion of the output code in response to the state or value of the encoded data symbols is well known in the art. For example, a 'sign bit' for the orthogonal function values can simply be changed in response to the input data.

In contrast, the orthogonal functions implemented using the new combining architecture of the present invention form a part of the architecture organization or structure, and do not require separate code sequence generators, such as Walsh code generators. The architecture can be configured to implement entire Walsh code sequences for each data input signal, or permutations of short PN sequences, that produce preselected code sequences in response to commands and timing signals from a control processor. The combining or summation elements 162 can be manufactured using a variety of circuits known in the art.

Where desired, the orthogonal codes can be dynamically adjusted using command signals from a control element such as processor 84 to alter the 'sign' (+/−) used in the various summation elements. That is, change positive to negative. However, for most applications, such adjustments are likely to prove to be too complex and generally data is redirected from one input to another to effect a different code operation. That is, data for the $i^{th}$ subscriber is assigned to the $r^{th}$ input where r represents the number or index value identifying a particular orthogonal code, here Walsh function, to be applied to the data. As the desired code changes for a subscriber, the data for the $i^{th}$ subscriber is simply redirected to another one of the inputs associated with the new desired code. This also allows easy application of the same data to multiple inputs for transfer over multiple encoded channels, if desired.

After each data symbol has been transferred into FHT 144+, the resulting coded sequences are transferred to selection mechanism or selector 150, as previously discussed, using output buses or lines $170_r$ (for example $170_0$–$170_7$). In order to effect the appropriate timing and control, or to group the data in a particular block size, a series of symbol accumulators, storage elements, or latches (not shown) can be connected in series with outputs $170_i$. This type of structure is well known in the art and not discussed in further detail here.

The application of specific orthogonal functions or Walsh code sequences can be understood by observing the structure of the output signals exiting FHT processor 144' in FIG. 6, in view of the structure of the W(4) matrix discussed above. It can be readily seen in FIG. 6 that each output signal ($170_r$) is generally equivalent to a summation across one column of a matrix that is the product of the input data and Fast Hadamard matrix W(4). That is, the product of one set of subscriber data and each orthogonal function, row, comprising the matrix. This analogous example is presented pictorially in FIG. 7.

In FIG. 7, the data represented by $E_0$, $E_1$, $E_2$, and $E_3$ is combined with the first, second, third, and fourth rows, respectively, of the W(4) matrix, and the result is the matrix shown in FIG. 7 having first row entries of $E_0$, $E_0$, $E_0$, $E_0$; second row entries of $E_1$, $-E_1$, $E_1$, $-E_1$; third row entries of $E_2$, $E_2$, $E_2$, $E_2$, and fourth row entries of $E_3$, $E_3$, $E_3$, $E_3$. If the entries were then summed by column, the sum of the first column would be $E_0+E_1+E_2+E_3$ and those for the second through fourth columns would be $E_0-E_1+E_2-E_3$, $E_0-E_1-E_2+E_3$, and $E_0-E_1-E_2+E_3$, respectively. These then are the same as the signals $170_0$, $170_1$, $170_2$, and $170_3$, respectively, being output by FHT processor 144' shown in FIG. 6.

The process illustrated in FIG. 6 can easily be expanded to higher orders or lengths for the orthogonal functions being implemented, and for larger numbers of input signals. This exemplary technique for implementing Walsh functions uses $N \log_2 N$ total summation elements for every N inputs, with interconnections among elements forming an $N \log_2 N$ array of elements having $\log_2 N$ signal processing layers of elements for which one-half of the inputs in each layer are sign reversed.

Figure 8:
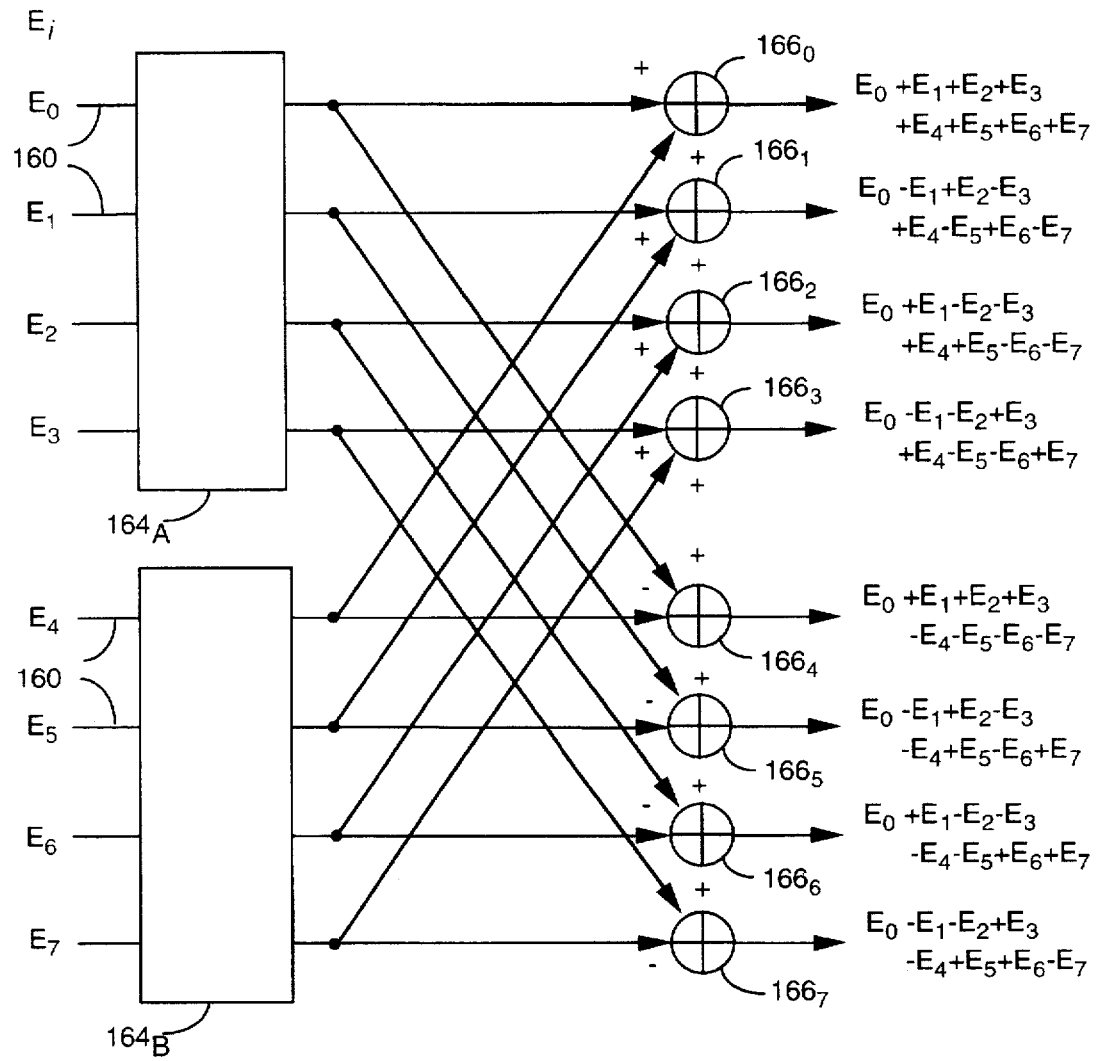
FIG. 8 illustrates an alternate embodiment of an FHT processor useful for implementing the FHT processor of FIG. 6.

One example of this type of expansion is shown in FIG. 8 where eight (8) input data signals are combined and transferred over eight (8) output channels. In FIG. 8, two FHT processors $164_A$ and $164_B$ are shown receiving the eight data signals. Each of these processors has essentially the same internal structure and employs the same processing steps as illustrated in FIG. 6 for FHT processor 144'. The data output from these two processors or stages, four outputs each, are then input to a series of combination or summation elements $166_i$, here $166_0$ through $166_7$. Each of these elements combines two signals together, one from processor stage $164_A$ and one from processor stage $164_B$ to generate the output signals illustrated in the figure. Using these elements, the signals are either summed positively or negatively, added or subtracted, with each other to generate the desired output signals.

Figure 9:
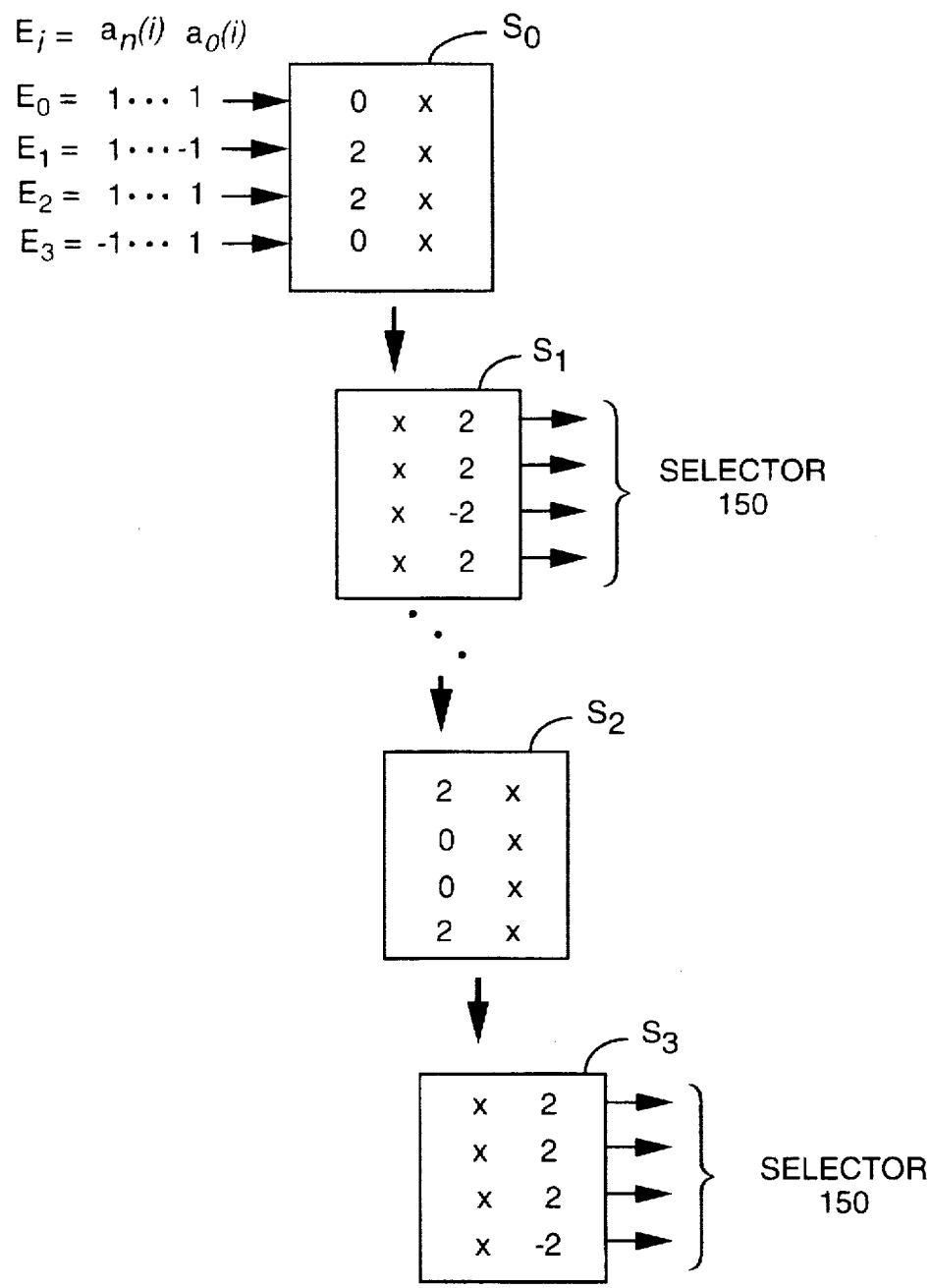
FIG. 9 illustrates the operation of the FHT processor of FIG. 6.

An exemplary operation of the FHT processor shown in FIGS. 5 and 6 is illustrated in FIG. 9. In FIG. 9, a series of encoded data symbols $a_n(i)$, here $a_n(0)$ through $a_n(3)$, associated with each encoded data signal $E_i$ are transferred into FHT processor 144' during appropriate symbol time intervals. A first set of data $a_0(i)$ is transferred in during one interval, a second set $a_1(i)$ during a second interval, and subsequent sets $a_2(i)$ through $a_n(i)$ during subsequent symbol time intervals. The results of the summation operations effected by the structure illustrated above in FIG. 6 are shown in a series of processing steps $S_0$–$S_3$.

In the first processing step $S_1$, the values resulting from the operations of combining elements $162_0$–$162_3$, are listed in a column with the values generated by the second set of combining elements $162_4$–$162_7$ being listed simply as the unknown 'x'. These values are either nonexistent at this point, the outputs having been reset to zero prior to data $a_n(i)$ input, or being values from previous data input which are treated as unknown for purposes of clarity. The results of entering the values generated in the first set of elements into the second set of elements during a second time interval, during which time more data is input into the first set of elements, is shown in a second data set or step $S_1$ and the results of entering data symbol values $a_n(i)$ occurring several symbols later in each data signal is illustrated in the third and forth data sets or steps $S_2$ and $S_3$, with subsequent values being labeled again as the unknown 'x'.

This generates a single summation value for each output line or 'row' of the FHT processor which then forms one value in a series of values $J_r$ representing jointly orthogonally encoded data symbols. Here r represents the $r^{th}$ output symbol position or line for the FHT processor. The combined data or set of symbols $J_r$ are generated in parallel and are typically transferred in series by selector 150 to the PN spreading stage of the gateway modulators or transmitters. Therefore, a parallel-to-serial conversion generally occurs to this data as part of the selection process. However, the selection process can transfer larger amounts of data in parallel and subsequent elements can be used to convert the data format, as desired.

The $J_r$ data consists of a series of bits representing each FHT output value. For the exemplary values shown in FIG. 9, where i=3 and $-4 \leq J_r \leq 4$, it takes as many as 4 bits (one sign bit) to transfer each value. For the larger i=127 configurations, $-128 \leq J_r \leq 128$ and may require up to 9 bits to transfer each value. This output data is then spread and modulated onto the carrier signal as previously discussed, and transmitted using common carrier signals to various system subscribers within the communication system.

Upon reception, the communication signals containing data $J_r$ are despread so that the transformed or covered data symbols can be recovered. That is, the data symbols for all active users are in the received signal, as output from FHT processor 144 (144', $164_A$, or $164_B$) and selector 150. However, a subscriber unit is only interested in decoding a received signal with regard to one or more specific orthogonal codes or data channels.

Figure 10:
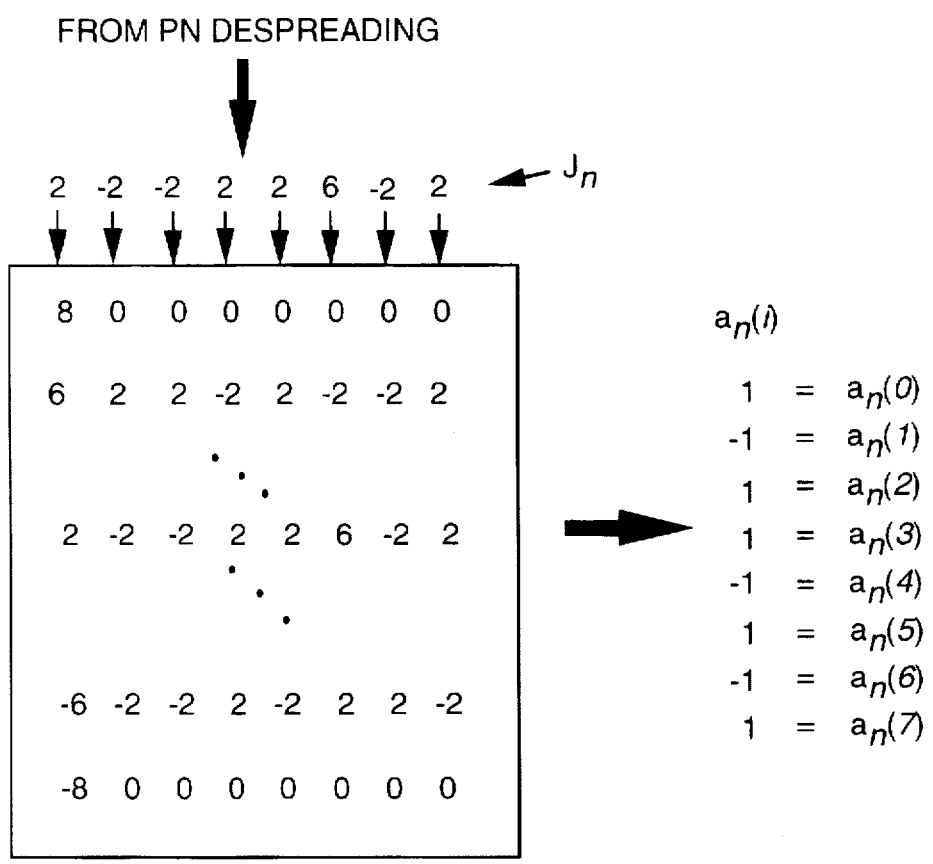
FIG. 10 illustrates the operation of a corresponding reception stage for receiving and decoding signals from the modulator of FIG. 4.

The joint data $J_r$ can be decoded by application to a memory device or other type of look-up table or similar structure as illustrated in FIG. 10. Here, the exemplary values are transferred into a look-up table $L_1$ where they act as a data address for pre-stored data values which selects the one encoded symbol value set stored in the table that could generate the joint data $J_r$. The input symbols select the appropriate data symbols that would generate that set. The resulting output is the encoded data symbols $a_n(i)$, here $a_n(0)-a_n(7)$, which can be used to reconstruct the data transmitted to each subscriber unit.

Therefore, the encoded data symbols in a received signal are typically grouped, or re-grouped, into sets of symbols that represent the orthogonally encoded symbols. In any case, methods of applying orthogonal codes to received data signals for decoding such signals for subscribers are well known and described in the patents referenced above. The present invention only requires the selection of the encoded symbols to be used within such techniques as will be apparent to those skilled in the art.

Figure 11:
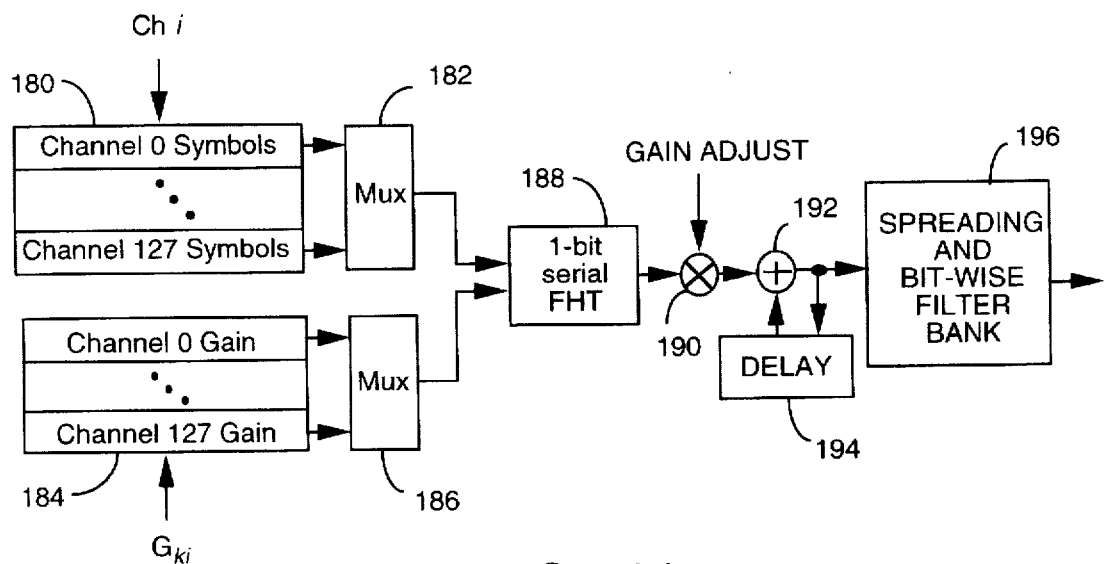
FIG. 11 illustrates an exemplary design useful for manufacturing the transmitter of FIG. 5 using large scale integration techniques.

One alternative approach to implementing the above structure and operations is illustrated in FIG. 11 where a one-bit serial FHT processor is employed. Here, the parallel data sequence inputs can obtain only three values, ±1 and 0. The encoding and interleaving operations can be done, as discussed above, either separately for each channel, or by sharing the requisite hardware and transmitting in a burst mode for each system subscriber. Coded symbol data 180 represents the resulting outputs for all of the interleaved channels, here 128 such channels. The symbol data for each channel can be stored in memory elements or otherwise latched or accumulated for subsequent selection and operations, as desired. The same is also true for gain factors for each channel.

There is a corresponding array of channel gain factors 184 for each of the 128 channels being input into the FHT processor. The coded symbols are transferred through one or more multiplexing elements 182 to provide a bit-wise serial stream. While one such multiplexer is illustrated in each branch of the circuit in FIG. 11, more can be used in accordance with the particular system structure, such as where additional storage elements are used for the data symbols, or to simplify the multiplexer by reducing the number of channels to be accommodated at one time. The same process is implemented for the gain factors using a multiplexer 186.

The outputs from multiplexers 182 and 186 are input to an FHT processor 188 where they are then combined together and orthogonally encoded. The FHT operation can be easily implemented using a single serial one-bit FHT processing element or device. Here, FHT processor 188 changes the input data values as appropriate to generate the summation (or subtraction) values as previously discussed. The data is combined by directing the matched sets of bits through FHT processor 188. The transformation structure or 'pattern' used by FHT processor 188 can be supplied by another processing or control element such as processor 84 or generated as required for each signal input under the control of processor 84. The combined channel output may then be further gain adjusted using a logic element 190 which performs an additional spreading function for the symbol data output from FHT processor 188. In FIG. 11, the gain adjustment operation for element 190 is illustrated as a single signal path, however, this operation occurs for both the I and Q channels separately. That is, the I and Q channels are gain adjusted in parallel in two separate processing arms or branches, as would be understood by those skilled in the art.

The output from gain adjustment element 190 (each parallel arm) is transferred to a spreading and bit-wise filter bank 196, where it is spread using the appropriate outer PN code and filtered to remove unwanted frequency components. An appropriate filtering operation can be realized by using, for example, several one bit input FIR filters, using structures known in the art. The output of gain adjustment element 190 is also summed in an adder 192 with a delayed version of itself from a delay element 194. Delay element 194 retrieves the gain adjusted signal and delays it by a preselected period on the order of one code sequence or function period of 128 chips, in this example, and then presents the delayed signal to adder 192. Filter bank 196 output is then transferred to analog signal processing circuitry for power control and amplification and other shaping or preparation for transmission to satellite repeaters.

What has been described then is a new method and apparatus for generating signal carriers in a spread spectrum communication system and a method of modulating multiple subscriber signals onto a common carrier. This provides a less complex and more cost effective technique for generating desired spread spectrum communication signals that carry many user channels.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What I claim is:

1. Apparatus for orthogonally encoding a plurality of digital data signals in a spread spectrum communication system in which information is communicated over orthogonally encoded data signals which are subsequently spectrum spread, comprising:

first multiplexing means for receiving a plurality of said digital data signals in parallel and forming them into single a bit-wise serial data stream;

second multiplexing means for receiving a plurality of channel gain factors in parallel, each corresponding to a predetermined digital data signal, and forming them into a single bit-wise serial gain stream; and a bit serial Fast Hadamard transformation means connected to receive said bit-wise serial data and gain streams for combining together in a corresponding pairwise fashion and for applying at least one preselected orthogonal function thereto from a plurality of orthogonal functions so as to produce an orthogonally covered gain adjusted data signal.

2. The apparatus of claim 1 wherein said plurality of orthogonal functions comprise Walsh functions.

3. The apparatus of claim 1 wherein said plurality of orthogonal functions comprise short orthogonal PN code sequences, with a period less than $2^{15}$ chips in length.

4. The apparatus of claim 1 further comprising control means coupled to said Fast Hadamard transformation means for generating a transformation structure for use by said Fast Hadamard transformation means.

5. The apparatus of claim 4 wherein said control means dynamically adjusts said transformation structure in response to data signals being received.

6. The apparatus of claim 1 wherein said plurality of orthogonal functions comprise short orthogonal PN code sequences with a period on the order of 27 chips in length.

7. The apparatus of claim 1 further comprising:
 means for spreading said orthogonally covered gain adjusted data signal using at least one predetermined PN spreading code; and
 a bit-wise filter bank for removing unwanted frequency components from said orthogonally covered gain adjusted data signal.

8. The apparatus of claim 7 wherein said bit-wise filter bank comprises a plurality of one bit input FIR filters.

9. The apparatus of claim 1 further comprising at least one gain adjusting element connected to receive the output from said Fast Hadamard transformation means to perform an additional spreading function for symbol data output therefrom.

10. The apparatus of claim 9 further comprising:
 delay means connected to receive an output from said gain adjusting element for delaying a gain adjusted signal by a preselected period on the order of the length of one orthogonal function period; and
 summation means for adding an output of said gain adjusting element to a delayed version thereof.

11. A method of orthogonally encoding a plurality of digital data signals to be transmitted to system subscribers over separate user channels in a spread spectrum communication system in which information is communicated over orthogonally encoded data signals which are subsequently spectrum spread, comprising the steps of:
 receiving a plurality of said digital data signals in parallel for active channels, and multiplexing them into single a bit-wise serial data stream;
 receiving a plurality of channel gain factors in parallel, each corresponding to a predetermined digital data signal, and multiplexing them into a single bit-wise serial gain stream; and
 receiving and combining together said bit-wise serial data and gain streams in a bit serial Fast Hadamard transformation means, in a corresponding pairwise fashion, and applying at least one preselected orthogonal function thereto from a plurality of orthogonal functions so as to produce an orthogonally covered gain adjusted data signal.

12. The method of claim 11 wherein said plurality of orthogonal functions comprise Walsh functions.

13. The method of claim 11 wherein said plurality of orthogonal functions comprise short orthogonal PN code sequences, with a period less than $2^{15}$ chips in length.

14. The method of claim 11 wherein said plurality of orthogonal functions comprise short orthogonal PN code sequences, with a period on the order of $2^7$ chips in length.

15. The method of claim 11 further comprising the steps of:
 spreading said orthogonally covered gain adjusted data signal using at least one predetermined PN spreading code; and
 removing unwanted frequency components from said orthogonally covered gain adjusted data signal using a bit-wise filter bank.

16. The method of claim 11 further comprising the step of applying an additional gain adjustment function to symbol data output from said Fast Hadamard transformation means.

17. The method of claim 16 further comprising the steps of:
 receiving gain adjusted symbol data and applying a preselected period of delay thereto, on the order of the length of one orthogonal function period; and
 adding gain adjusted symbol data to a delayed version thereof.

18. The method of claim 11 further comprising the steps of generating a transformation structure for use by said Fast Hadamard transformation means; and transferring said transformation structure thereto.

19. The method of claim 18 further comprising the step of dynamically adjusting said transformation structure in response to data signals being received.

* * * * *